Patented Feb. 8, 1949

2,460,998

UNITED STATES PATENT OFFICE 2,460,998

METHOD OF COATING PAPER

Harley E. Nelson, Park Ridge, Ill., assignor, by mesne assignments, to Stein, Hall & Co., Inc., a corporation of New York No Drawing. Application March 20, 1944, Serial No. 527,337

3 Claims. (Cl. 117—76)

This invention relates to a method of coating and more particularly to a method of coating paper and to the products obtained thereby.

One of the objects of the invention is to provide a new and improved coating method wherein normally water dispersible film forming coating compositions are insolubilized in situ.

Another object of the invention is to provide a new and improved method for applying coatings to paper.

Still a further object of the invention is the provision of a method for producing improved papers particularly suited for printing processes wherein a relatively high wax test and resistance to wet rub are required.

A more specific object of the invention is the provision of a method of coating paper which can be used to replace the so-called casein coating methods now principally employed to produce moisture resistant printing papers.

Still a further object of the invention is to produce new and improved coated articles, new and improved coated papers and particularly new and improved printing papers. Other objects will appear hereinafter.

In accomplishing these objects in accordance with this invention, it has been found that new and improved results in coating are obtained by treating an article to be coated in the following manner. First, by coating said article, as for example, paper, with a coating composition comprising a starchy polysaccharide film forming binder substantially without the addition of any insolubilizing agent for said binder; secondly, setting said coating, preferably by partially drying it; and thirdly, thereafter applying to said previously formed or preformed coating a second coating or thin layer of an insolubilizing agent for said binder comprising a water dispersible resin forming substance reactive with said binder. The separate phase application of the aforesaid coatings is essential for the purpose of the invention, it being understood, however, that improved results are obtained under certain conditions of treatment and by certain additional steps as hereinafter described.

The water insolubilizing substance, e. g., a resin forming material which is reactive with the binder to insolubilize it, is added after the coating composition comprising the binder has been applied because greatly improved results are thereby obtained, as compared with those obtained where attempts have been made to add resins or resin forming materials with the coating composition. The invention will be described particularly with reference to the coating of paper.

In the practice of the invention it is usually desirable to employ a catalyst to catalyze the reaction between the binder and the insolubilizing agent for the binder. For this purpose acid catalysts or catalysts which decompose under the influence of heat to form acids or acidic substances are preferably employed. Typical examples of free acid catalysts are: boric, hydrochloric, phosphoric, acetic, lactic, and benzene sulfonic acids; of acid catalysts in the form of salts exhibiting an acid reaction in aqueous solutions at ordinary temperatures: ammonium chloride, aluminum sulfate and aluminum chloride; of catalysts decomposing to give an acidic reaction under the influence of heat: sodium monochloroacetate, potassium monochloroacetate, sodium monochlorosuccinate, triethanolamine acetate, triethanolamine hydrochloride, and benzyl chloride para sulfonic acid sodium salt.

The catalyst may be added to the coating composition, or it may be added in a separate step after the coating has been applied, or it can be added with the resin forming solution. Another possibility is the addition of the catalyst prior to the coating, but in paper making this procedure is not recommended because apparently the catalyst solution is absorbed by the cellulose fibers, so that it is not as readily available to catalyze the reaction between the coating and the resin forming insolubilizing agent.

Of the starchy polysaccharides, good results have been obtained by employing those starchy polysaccharides which have heretofore been used or which are capable of satisfactory use as binders in paper coating compositions. Starch degeneration products, that is to say, starches which have been degraded by heat, oxidation, acids or enzymatic action may be employed in accordance with the invention as the film forming base. If desired, mixtures of undegenerated and degenerated starches may be used. Among the suitable starchy materials may be mentioned wheat, rye, barley, oat, rice, corn and potato starches, sago and cassava flours and colloidal modifications thereof, and other starches and flours and derivatives thereof. The term "amylaceous" is employed herein to cover generically starchy polysaccharides, including cereal flours and their degeneration products.

The film forming base may consist of a single type of film forming material or a plurality of such material; thus, it may contain one or more amylaceous film forming substances, or it may contain one or more amylaceous substances and a polyvinyl alcohol or some other film forming substance. In such compositions the amylaceous substance or substances preferably comprise the principal film forming ingredient, with the other substance or substances present in minor proportion. The term "film forming" as employed herein is a term used to describe substances which are capable of forming continuous films after being applied in the form of a colloidal dispersion in water to a surface and dried. The substances employed in accordance with the present invention derive their water dispersibility characteristics from the fact that they contain a plurality of hydroxyl groups and may therefore be said to be polyhydroxylated compounds.

The resin forming substances employed for the purpose of the invention are capable of reacting with the film forming binder or coating base to insolubilize it. Suitable resin forming substances for this purpose are, for example, dimethylol urea, other water soluble or water dispersible condensation products of urea and formaldehyde, the melamine resins, as for example, melamine formaldehyde hydrochloride, and in general any of the water dispersible film forming resin materials derived from aldehydes, such resins being herein referred to as aldehydic resins.

After the coating and the resin solution have been applied in separate phases it is preferable to heat the coated article to a predetermined elevated temperature for a period of time sufficiently long to effect the reaction between the resin and the film forming coating base. This can be accomplished in any suitable manner, for example, by passing the article through a tunnel heated to an elevated temperature, or if the article is in the form of a sheet, such as paper, it may be passed over heated rolls.

The time of heating is also a factor in effecting the insolubilization of the coating film. Stated in another way, for a given set of conditions involving a fixed proportion of resin forming material to coating base at a fixed pH there is a minimum temperature of the resin-coating base combination that has to be attained to completely insolubilize the coating base in a given interval of time.

The minimum proportion of the resin forming material with respect to the polyhydroxylated film forming binder present in the coating base may vary somewhat depending upon the particular chemical characteristics of the resin forming material and the binder, but in general it has been found that the resin forming component should be at least 7% by weight of the film forming binder which is to be insolubilized. The maximum proportion of the resin forming ingredient will be determined to a considerable extent by the nature of the article being treated; thus, in the treatment of paper the proportion of resin forming material employed should be insufficient to materially alter the stiffness characteristics or brittleness of the paper. Good results have been obtained by employing approximately 10 to 25% of resin based on the weight of starch used as a binder in making coated paper.

A low pH tends to accelerate the insolubilizing action of the resin solution on the coating base. However, effective insolubilization has been obtained with a pH within the range from 2 to 10. While it is preferable to effect the insolubilizing reaction at a relatively low pH in order thereby to maintain a reasonably low temperature and a minimum time period, one of the principal difficulties is that the low pH causes brittleness in paper and similar sheet materials. It has been found in accordance with this invention that this difficulty is overcome by treating the coated article, such as a paper sheet, with an alkaline solution in order to increase the pH, preferably to a pH within the range of 5.5 to 6.5, after the insolubilization reaction.

It is preferable in accordance with the invention that the final article, as for example a coated paper sheet, be on the acid side, preferably within the range of about pH 5 to pH 6.5 and it may, if desired, be dried to a normal moisture content, say 4 to 6% moisture. Drying on the acid side is a factor in increasing the wet rub of the sheet and may be employed as a means of reducing the heating time normally required for insolubilization of the coating base.

The invention was evaluated by comparable tests made on paper and the tests primarily relied upon in evaluating the improved results of the invention were the wax test using Dennison waxes and a wet rub test based upon the use of a wallpaper tester well known in the wallpaper industry. The Dennison wax test is well known in the coated paper industry and is a test based upon the use of various numbered waxes, the higher numbered waxes being more adapted to pick off the coating from the paper than lower numbered waxes; thus, whereas a Dennison wax test of 5 would be considered excellent for ordinary coated paper, it is possible in accordance with the practice of the present invention to produce a coated paper having a wax test of 6 to 9 and at the same time to impart to the paper wet rub characteristics which the ordinary coated paper, that is to say, a starch-coated paper, does not have to any extent whatsoever.

The wet rub tester consists of a mechanical rubbing device made up as follows. On a brass ring, 10" O. D. and 8" I. D., ⅝" thick, is mounted a bearing supporting device that will position a shaft in the exact center of the 8" I. D. circle, the shaft being perpendicular to a plane parallel to the diameter of the brass ring. This shaft in turn supports a scouring head, made to weigh exactly four pounds when affixed with rubber sponge and gauze. This scouring head is positioned by a saddle which allows the full weight of the head to float freely upon the paper surface being scrubbed; the circular path of the scrubbing head having its outer edge 2¾" from the center of the shaft and the inner edge 1" from the center of the shaft; the actual width of the scrubbing mark being about 1½". The scrubbing surface of the scrubbing head consists of gauze, regular surgical dressing variety, stretched over a sponge rubber mat, the purpose of which is to keep the gauze saturated with a soap solution and to equalize distribution of the weight of the scrubbing head uniformly over the surface being scrubbed.

The scrubbing head is rotated at a uniform speed of 95 to 100 R. P. M. either by hand or motor driven.

The actual test consists of cutting a sample of paper that is at least 10" in diameter, placing this sheet of paper on a smooth flat surface, and positioning the scrubber centrally over the paper. Fifteen cc. of a ⅛% pure soap solution is poured onto the sample in the vicinity of the scrubbing head. The head is then rotated over the surface of the paper until visible evidence of scuffing is noted, or to a definite number of revolutions. If the latter method of evaluation is used, the paper is allowed to dry and then the scrubbed area examined for abrasion losses.

For such papers as washable wallpaper and printing papers, sheets that show no loss of coating on 25 revolutions of the scrubber are considered satisfactory.

The invention will be further illustrated but is not limited by the following examples in which the parts are stated in quantities by weight unless otherwise indicated.

EXAMPLE I 102 parts of starch (e. g., a chlorinated starch, such as is used in preparing paper coating, or a potato starch) is mixed with 300 parts of water and cooked to 200° F., at which temperature the mixture is held 10 minutes. The mixture is cooled and made up to 552 parts by weight with water.

In a separate vessel 600 parts of H. T. coating clay are mixed with 560 parts of water for 5 minutes, and ¼ to ½% of sodium acid pyrophosphate is added as a deflocculating agent and the mixing is continued for 30 minutes. The previously prepared cooked starch solution is then added and the mixing is continued for another 15 minutes.

The coating base (or the coating color) prepared as above described is applied to a suitable paper, such as is ordinarily used in making coated papers, the application being made by any conventional means to one side of the paper by a knife coater, brush coater, roll coater, or machine coater, or in any other suitable manner effective to obtain uniform distribution of the coating over the surface of the paper. If desired, both sides of the paper are coated.

The coated paper is then air dried until the coating is set, so that it will not ordinarily be picked off by a metal roll. The amount of moisture remaining in the coated paper will usually be within the range of 2 to 7%.

There is then applied to the coated side of the paper or to both sides (coated or uncoated) in any suitable manner a 2% solution of a urea formaldehyde water soluble partial condensation product, for example, Plaskon (335–11). This application is preferably accomplished in a sized press or wringer through which the previously coated paper is passed, both rolls of the press or wringer being driven.

The paper is then heated by passing it over a hot roll heated internally with 30 pounds steam pressure gauge, the temperature of heating being about 250° F. and the time interval approximately 30 seconds.

The acid coating slip prepared from the clay and sodium acid pyrophosphate has a pH of about 4.1. The pH of the resin solution is approximately 7.0. The resultant coated sheets will show a Dennison pick test of about 8, as compared with a pick test of 5 for the same coated sheets which have not been treated with the urea formaldehyde resin.

Concentrations of the urea formaldehyde resin varying from 1.25% to 20% all give good resistance to wet rub.

However, where the resin solutions are incorporated in the coating slips and the coated sheet is then treated with a 10% alum solution these sheets do not show any resistance to wet rub, nor are their wax tests any good; thus, the desired result is not obtained by incorporating the resin solution directly with the film forming binder.

EXAMPLE II

An enzyme converted rye flour is employed as the binder in the coating composition in place of the starch in Example I and the final product exhibited a Dennison wax test of 6 or 7 as compared with a wax test of 2 to 3 for the same paper coated with the coating composition containing the rye flour conversion product but without the after treatment by the urea formaldehyde solution.

EXAMPLE III

This example illustrates the effect of time, temperature and relative proportions of starch and resin on the results obtained. The coating color was prepared as in Example I and had a pH of about 5.7. After the coating was applied and set by air drying, the coated sheets were wringer treated with a 5% solution of Plaskon (335–11) having a pH of about 5.0. After the sheets had been treated with the resin they were dried on a hot roll at 280° F. with the following results as indicated by Table 1 and Table 2:

*Table 1*

| Sheet No. | Sheet Wt. | Wet pick-up | Amt. Plaskon picked up (dry basis) | Starch in the Coating | Resin on Starch |
|---|---|---|---|---|---|
| | Grams | Grams | Grams | Grams | Per cent |
| 1 | 6.94 | 1.05 | .0525 | 0.32 | 16.4 |
| 2 | 6.90 | 1.05 | .0525 | 0.31 | 16.9 |
| 3 | 6.97 | 0.93 | .0465 | 0.32 | 14.5 |
| 4 | 6.88 | 1.21 | .0605 | 0.31 | 19.4 |

*Table 2*

| Sheet No. | Wet Pick-up, percent | Seconds drying at 280° F. | Percent Loss in Wt. (Moisture) | Wet Rub |
|---|---|---|---|---|
| 1 | 15.2 | 10 | 4.6 | No Good. |
| 2 | 15.2 | 20 | 4.6 | Fair. |
| 3 | 13.3 | 30 | 4.8 | Good. |
| 4 | 17.6 | 40 | 4.5 | Do. |

From the above it is to be noted that 10 seconds drying was enough to remove all the moisture from the sheet. At this stage the wet rub was unsatisfactory. To bring the wet rub to a satisfactory condition required an additional 20 seconds drying.

EXAMPLE IV

This example illustrates the effect of using varying types of catalyst, varying proportions of catalyst, and varying pH values. The coating colors were made up as in Example I with the addition of varying percentages of different catalysts based on the weight of the starch in the coating color. The resin pick-up was about 10% based on the weight of the starch, so that the proportion of catalyst was 25%, 50% and 100% for each 2½%, 5% and 10% of catalyst based on the weight of starch, respectively. In this case the coating color was prepared according to the procedure set forth in Example I using a chlorinated corn starch known as Super-Film No. 6 and 0.5% of sodium acid pyrophosphate based on the weight of the H. T. Clay as the deflocculating agent. The coating color had a pH of 4.5 prior to adding the various amounts of catalysts.

The coated sheets were treated with a 5% solution of Plaskon (335–11) and its natural tap water pH of 8.0. Individual sheets were then dried on a hot roll at 5 pounds steam pressure (215° F.) for 15 second increments. The sheets were then given 60 wet rubs over a 40 second period on the wallpaper tester, previously described, using 15 cc. of a ⅛% soap solution to flood the sample.

The results were tabulated as follows:

Table 3

| Sample | Catalyst | Percent Catalyst on Wt. of Starch | pH |
|---|---|---|---|
| 1 | NH₄Cl | 2.5 | 4.2 |
| 2 | do | 5.0 | 4.1 |
| 3 | do | 10.0 | 4.1 |
| 4 | Al₂(SO₄)₃.14H₂O | 2.5 | 3.4 |
| 5 | do | 5.0 | 3.2 |
| 6 | do | 10.0 | 3.4 |
| 7 | AlCl₃·6H₂O | 2.5 | 3.2 |
| 8 | do | 5.0 | 2.7 |
| 9 | do | 10.0 | 2.4 |

Table 4

| Sample | Seconds drying to good wet rub | Wax Pick before resin treatment | Wax Pick after resin treatment |
|---|---|---|---|
| 1 | 75 | 4 | 5 |
| 2 | 30 | 3 | 5 |
| 3 | 15 | 2 | 5 |
| 4 | 30 | 2 | 5 |
| 5 | 15 | 2 | 6 |
| 6 | 15 | 2 | 6 |
| 7 | 15 | 2 | 4 |
| 8 | 15 | 2 | 5 |
| 9 | 15 | 2 | 6 |

In connection with these results it is to be noted (1) that the brittleness of the sheets increased in direct proportion to the amount and kind of catalyst used; (2) Ammonium chloride is the weakest catalyst, alum is intermediate in potency, and aluminum chloride is the most potent.

To circumvent the brittleness problem, a sheet comparable to sample 9 (10% aluminum chloride based on the weight of starch) was given a final tub sizing treatment, that is, after being treated with the resin and dried for the necessary period of time with a 5% solution of ammonia, the sheet was then dried to a 5 to 6% moisture content and this sheet showed no evidence of any brittleness, being just as supple as the base sheet. The wet rub and wax test were comparable to sheet 9. In other words, the ammonia did not affect these qualities but would prevent the sheet from becoming brittle.

The same set of sheets that the wax tests were made on were then placed in a hot air drier for 12 hours where the temperature was approximately 220° F. and wax tests were again made with the following results:

Table 5

| Sample | Before Air Drying | After Air Drying 12 hrs. at 220° F. |
|---|---|---|
| 1 | 5 | 5 |
| 2 | 5 | 4 |
| 3 | 5 | 5 |
| 4 | 5 | 5 |
| 5 | 6 | 4 |
| 6 | 6 | 5 |
| 7 | 4 | 4 |
| 8 | 5 | 5 |
| 9 | 6 | 5 |
| 9+(NH₃) | 5 | 5 |

The air drying at this temperature apparently did not greatly affect the wax test but it did make the sheets more brittle, with the exception of the ammonia treated sheet which retained its pliability.

EXAMPLE V

A coating color was prepared (pH 4.4) and used to coat sheets which were treated with a 5% solution of ammonium chloride (5.85) and dried for 30 seconds at 4 pounds steam pressure. These sheets were then treated with a 5% solution of Plaskon (335-11) having its pH adjusted to 2.7 with hydrochloric acid.

15 seconds drying at 4 pounds steam pressure gave a sheet of excellent wet rub characteristics. The wax tests were as follows:

Table 6

```
                                            Wax test
Base sheet—pH 4.4 _____      2
Treated with 5% NH₄Cl, dried _____      3
Treated with 5% Plaskon 335-11 _____      7
```

At this low pH the solution life of the resin was approximately 1 hour. Adding the catalyst to the resin solution gave comparable results to adding either to the coating color or as an additional sizing treatment. The objection here is that the working life of the resin solution is reduced to too short a period.

EXAMPLE VI

This example illustrates the effect of various concentrations of resin. The coated sheets were prepared with a coating color similar to that described in Example I having a pH of 5.7 and were treated with various concentrations of Plaskon (335-11), pH 4.9, and dried for 60 seconds at 280° F., with the results set forth in the following table:

Table 7

| Conc. of Resin Sol. | Sheet Wt., Gms. | Wet Pick-up, Gms. | Per Cent Wet Pick-up | Per Cent Resin on Paper | Per Cent Resin on Starch | Wet Rub |
|---|---|---|---|---|---|---|
| 10 | 7.00 | 0.81 | 11.56 | 1.15 | 23.9 | good. |
| 10 | 6.96 | 0.83 | 11.92 | 1.19 | 24.9 | Do. |
| 5 | 6.87 | 0.95 | 13.81 | 0.69 | 14.8 | Do. |
| 5 | 6.93 | 0.93 | 13.41 | 0.67 | 14.2 | Do. |
| 2.5 | 6.87 | 0.98 | 14.23 | 0.36 | 7.7 | fair. |
| 2.5 | 6.90 | 0.96 | 13.90 | 0.35 | 7.5 | Do. |
| 1.25 | 6.83 | 0.89 | 13.03 | 0.16 | 3.6 | poor. |
| 1.25 | 7.03 | 1.03 | 14.70 | 0.18 | 3.7 | Do. |
| 1.25 | 6.97 | 0.96 | 13.75 | 0.17 | 3.6 | Do. |

From these results it can be concluded that the minimum resin requirements to completely insolubilize the starch was in the neighborhood of 10% resin based on the weight of the starch, although some effect was obtained with as low as about 7% resin.

EXAMPLE VII

This example also illustrates the effect of resin concentration on wax test and wet rub. The coating color was prepared as in Example I and had a pH of 4.35 and the various concentrations of resins were adjusted to 5.7. The sheets after the addition of the resin were dried at 280° F. for 60 seconds with the results indicated in the following table:

Table 8

| Resin Concentration Plaskon— (335-11) | Wax Test | Wet Rub |
|---|---|---|
| Per cent | | |
| 20.0 | 9 | Very good. |
| 10.0 | 9 | Do. |
| 5.0 | 8 | Do. |
| 2.5 | 7 | Good. |
| 1.25 | 6 | Fair. |
| .62 | 5 | Poor. |
| .31 | 5 | Do. |
| .00 | 4 | Do. |

It is to be noted from the foregoing result that using a secondary treatment with a 5% resin solution, the wax test can be doubled as compared with that of the untreated coated sheet, and with greater concentrations of resin a still further improvement in the wax test is noted. This result is general for it has worked out in this manner with various adhesives used in the coatings.

EXAMPLE VIII 102 parts of a chlorinated corn starch is mixed with 300 parts of tap water and heated to 200° F., at which temperature the mixture is held for 10 minutes, an additional quantity of water is added to bring the total weight of the mixture up to 552 parts.

In a separate vessel 600 parts of H. T. coating clay, 3 parts of anhydrous sodium carbonate, and 560 grams of tap water are mixed for 30 minutes and thereafter the chlorinated corn starch mixture, prepared as above described, is added and the mixing continued for another 30 minutes. The pH of the resultant mixture is approximately 8.65.

This coating color is then applied as described in Example I to an ordinary coating paper raw stock weighing 50 pounds per ream of 500 sheets, 25 inches by 38 inches, and the coat weight applied to one side of the paper is 15 pounds per ream, making the total weight 65 pounds per ream. Both sides can be coated if desired, in which case a coat weight of approximately 12 pounds per ream is applied to each side.

The paper is air dried to about 4–6% moisture and thereafter a 5% solution of a melamine formaldehyde hydrochloride is applied by passing the paper through a tub size press or between ringer rolls with both the upper and lower rolls driven. The 5% solution of melamine formaldehyde hydrochloride is prepared by dispersing 50 parts of melamine formaldehyde (QJ 99—Resinous Products Company, Philadelphia, Pa., U. S. A.) in 485 parts of tap water at 120° F., with 15 parts of concentrated hydrochloric acid and diluting to 1000 parts with water. The pH is approximately 2.3.

Papers prepared in this manner were dried at different predetermined temperatures for different predetermined intervals and were given wet rub and wax tests with the following results:

Table 9

| Time | Temperature | Wet Rub | Wax Test |
|---|---|---|---|
| | °F. | | |
| 60 | 293–302 | good | 7 |
| 30 | 293–302 | ---do--- | 7 |
| 15 | 293–302 | ---do--- | 6 |
| 10 | 293–302 | ---do--- | 7 |
| 5 | 293–302 | ---do--- | 6 |
| 10 | 251 | ---do--- | 5 |
| 5 | 251 | ---do--- | 5 |

In a similar manner other types of resin solutions can be employed and other coating mixtures may be used, for example, an alkaline coating mixture having a pH of 8 or 9 can be applied to the paper and treated with 5% melamine hydrochloride solution having a pH of about 3.1, the latter being applied in a size press. The resultant sheet may then be air dried to set the coating so it will not be picked off on a wet metal surface and the air dried sheet may be run over hot rolls or through a tunnel at an elevated temperature in order to insolubilize the starch in the coating.

The foregoing examples clearly demonstrate the improvement obtained by the practice of the present invention as compared with present practice in making ordinary coated papers. Primarily the invention is important in the manufacture of wet rub resistant printing papers, that is to say, paper which is suitable for use in printing processes where the paper comes into contact with moisture. Thus, new and improved lithographic papers are obtained in accordance with the invention, as well as new and improved moisture resistant papers of other types. Due to the high wax test of the papers prepared in accordance with this invention, as well as the resistance to wet rub, the coatings on these papers are relatively permanent as compared with many other types of printing papers. The process of the present invention and the products obtained thereby can be used to replace the so-called casein coating methods and casein coated papers now principally employed in the industry.

It will be understood that while the invention is particularly suited for the coating of paper, other articles may also be coated in accordance with the practice of the invention. However, paper coating, and particularly the preparation of printing papers, presents special problems which are not necessarily present in other arts.

Another advantage of the invention, particularly with respect to its application to the coating of paper, is that the essential steps may be carried out without the necessity for employing too much extra apparatus and without the necessity for deviating from other steps ordinarily employed in the preparation of coated papers. One of the important features of the invention is the application to the coated sheet of the resin solutions by means of a size press, wringer, or the like, in which both rolls are driven. This produces a superior finish as compared with other methods of application and is believed to be a new and improved method of treating coated papers in general with any type of liquid, including water.

One feature of the invention is that it permits a relatively wide latitude in the acidity or alkalinity of the coating color. Thus, the coating color, that is, the mixture of binder and clay or a pigment, may be and in fact is preferably acidic in the practice of the present invention, whereas with casein coating the coating color must be alkaline. The use of an acidic coating color is especially desirable in that it permits a greater variation in the components of the coating color, including the choice of deflocculating agents.

Another feature of the invention is that acidic deflocculating agents also serve as catalysts for the reaction between the water dispersible film forming binder and the resin forming insolubilizing agent.

Having thus described the invention, what I claim as new and desire to secure by United States Letters Patent is:

1. A method of coating paper which comprises coating the paper in a wet way with a coating color composition comprising an acid deflocculated clay and a starchy polysaccharide film forming binder, drying the paper to produce a preformed set coating, thereafter treating said preformed coating in a separate step with a resinous condensation product from the class consisting of water dispersible film forming urea-formaldehyde resins and melamine-formaldehyde resins, and heating the resultant products sufficiently to insolubilize the resultant coating.

2. A method of coating paper which comprises coating the paper in a wet way with a coating color composition comprising an acid deflocculated clay and a starchy polysaccharide film forming binder, drying the paper to produce a preformed set coating, thereafter treating said preformed coating in a separate step with a solution of a partial condensation product of urea and formaldehyde, and heating the resultant product sufficiently to insolubilize the resultant coating.

3. A method of coating paper which comprises coating the paper in a wet way with a coating color composition comprising an acid deflocculated clay and a starchy polysaccharide film forming binder, drying the paper to produce a preformed set coating, thereafter treating said preformed coating in a separate step with a solution of a partial condensation product of melamine and formaldehyde, and heating the resultant product sufficiently to insolubilize the resultant coating.

HARLEY E. NELSON.

REFERENCES CITED

The following references are of record in the file of this patent:

UNITED STATES PATENTS

| Number | Name | Date |
|---|---|---|
| 2,212,314 | Bauer | Aug. 20, 1940 |
| 2,246,635 | Moller | June 24, 1941 |
| 2,293,690 | Harrigan | Aug. 18, 1942 |
| 2,322,887 | Schwartz | June 29, 1943 |

OTHER REFERENCES

Taft, Paper Trade Journal, October 15, 1942, pages 30 to 32.